United States Patent [19]

Freimanis

[11] 3,725,863

[45] Apr. 3, 1973

[54] BALANCED SEMICONDUCTOR SWITCHING NETWORK CIRCUIT AND CONSTRUCTION

[75] Inventor: Laimons Freimanis, Chicago, Ill.

[73] Assignee: Bell Telephone Laboratories, Incorporated, Murray Hill, N.J.

[22] Filed: Dec. 17, 1971

[21] Appl. No.: 209,330

[52] U.S. Cl.............340/166 R, 179/18 GF, 307/252, 340/176

[51] Int. Cl...............................................H04q 3/50

[58] Field of Search........340/166 R, 176; 179/18 GF

[56] References Cited

UNITED STATES PATENTS 3,655,920 4/1972 Laane ..........................340/166 R X 3,662,117 5/1972 Bhatt ..........................340/166 R X

*Primary Examiner*—Donald J. Yusko

*Attorney*—R. J. Guenther et al.

[57] ABSTRACT

A circuit organization and construction for a solid state, balanced switching network which compensates for the inherent capacitance presented by inactive crosspoint elements. Intersecting tip and ring conductors are mounted on opposite sides of a glass plate with thyristor chips mounted at alternating intersecting points within apertures in the plate. At the other intersecting points, the flat, coordinate conductors are so dimensioned that, with the interposed glass as a dielectric, capacitors are formed which present capacitances at idle crosspoints substantially canceling the capacitances presented by nonconducting thyristors.

13 Claims, 4 Drawing Figures

BALANCED SEMICONDUCTOR SWITCHING NETWORK CIRCUIT AND CONSTRUCTION

BACKGROUND OF THE INVENTION

This invention relates to telecommunications systems switching networks and particularly to the organization and construction of such networks employing solid state crosspoint devices.

Telecommunications systems having space division networks, including the more recent electronic systems, have in the past employed metallic contact crosspoints for establishing interconnections therethrough. These crosspoints have proved satisfactory from the standpoints of reliability and low contact resistance and, because they are electrically isolated from their operating circuits, are particularly well adapted for use in balanced networks. Metallic crosspoints have also been readily capable of transmitting through the switching network relatively high voltage, low frequency ringing signals, voice currents, and direct current control signals to and from the subscriber lines and trunks. In recent years, however, the demand for faster response time for network crosspoints as well as the advantages of circuit integration have turned the attention in the art from metallic contact relays to semiconductor switching devices as possible crosspoint elements. These elements such as PNPN thyristors, for example, have shown considerable promise and offer significant advantages over metallic crosspoints from the viewpoints of size, speed of operation, and cost, to name several. One of the properties of semiconductor crosspoint elements, on the other hand, which has presented a specific problem in its general network application is the fact that, unlike its metallic contact counterpart, when inactive in the network in defining a transmission path, it nevertheless presents an active capacitance at relatively low frequencies. An inactive thyristor crosspoint, for example, presents a capacitance of approximately 2 picofarads between its connected coordinate network conductors. This capacitance, presented at each inactive crosspoint, in effect establishes sneak conducting paths between a selected transmission path and others that may be active in the network and, as a result, ocassions serious crosstalk problems.

When a network is organized to operate in the unbalanced mode in the interest of crosspoint economy, no means are presently available to compensate within the network itself for the capacitive crosstalk because of the common ground of the conducting path. Only measures external to the network have been employed to reduce the effects of capacitive coupling. In the copending application of R. R. Laane, Ser. No. 89,599, filed Nov. 16, 1970, U.S. Pat. No. 3,655,920, which discloses an unbalanced thyristor network, for example, the effects of capacitive crosstalk within the network are substantially reduced externally by deliberately mismatching the impedances seen by the crosspoints at opposite ends of the network paths. At the output end of a path the impedance is reduced to a few ohms as compared to the impedance at the input end which is several orders greater. In other known thyristor networks the transmission paths have normally been relatively short and, in any event, have not had imposed severe crosstalk limitations. When adherence to such strict crosstalk limitations and other advantages not available in unbalanced arrangements are paramount factors in a network context, consideration of a balanced network is obviously indicated. Noise attentuation in such a network is significantly higher than in one that is unbalanced. Contributions from common mode sources such as imperfect power supplies and common ground planes, for example, are readily canceled. These and other advantages may largely offset the cost of double the number of crosspoints required to complete a balanced two-wire tip and ring conducting path through the network. Even this cost may not be significant in view of the small fraction of total network cost represented by its crosspoints; the largest portion of that total has proved to be attributable mainly to the per-line circuitry. Additionally, recent advances in the techniques of batch fabricating a plurality of semiconductor elements on a single chip have further reduced the cost of the crosspoints. As a result, any cost disadvantage previously inherent in balanced networks is becoming increasingly negligible.

The capacitance represented by an inactive semiconductor crosspoint manifestly must still be contended within a balanced network arrangement. In addition, because of the manner in which thyristor elements, for example, are fabricated, it has been necessary to separate the tip and ring circuits in individual matrices. At any tip and ring pair intersection in a balanced coordinate switch, only two crosspoints are required to establish a connection between a horizontal and vertical pair. As a result, because the semiconductor elements are conventionally batch fabricated on a single chip, at least two would go unused at each such intersection. These could present some utility in the redundancy provided; generally, however, they have represented wasted crosspoint connections and at best have introduced the risk of their activation by transient voltages in the network. As a result, resort has been had to the expedient of assembling the tip and ring crosspoints on individual modules, each circuit being operated in the unbalanced mode. The conducting paths are then balanced by a suitable transposition of the tip and ring circuits after leaving the respective matrices. Because of the physical separation of the circuits, however, it has not been possible to go immediately to a twisted pair. Further, and for the same reason, orderly wiring patterns are difficult to achieve.

Accordingly, an object of this invention is a balanced, solid state switching network organization in which the tip and ring circuit crosspoints are combined on the same substrate matrix without crosspoint redundancy.

It is also an object of this invention to provide a new and novel solid state network organization making possible a virtually complete cancellation of crosstalk resulting from inactive crosspoint capacitance.

A further object of this invention is a new and improved solid state switching network construction.

SUMMARY OF THE INVENTION

The foregoing and other objects of this invention are realized in one illustrative embodiment thereof comprising a solid state switching network arrangement in which tip and ring semiconductor crosspoint chips are arranged in a generally checkerboard fashion in alternating apertures of an insulating mounting plate. The alternating tip and ring chips each have deposited thereon an equal number of semiconductor elements—in the illustrative embodiment being considered, a plurality of thyristor crosspoints are carried by each chip. The tip-to-tip and ring-to-ring crosspoint interconnections are made between chips, respectively, on opposite sides of the insulating plate. All of the crosspoints on a chip are thus advantageously utilized in establishing balanced transmission paths through the network to achieve obvious economies in circuit elements. Since all are available for selection, no unnecessary crosspoints are present to increase the risk of chance activation of an inactive crosspoint by transient network voltages.

According to another aspect of this invention, the crossovers of the chip interconnections together with the interposed mounting plate advantageously constitute capacitance elements which operate to cancel the capacitance introduced by inactive crosspoints on the adjoining chips. The mounting plate material is selected to act as a suitable dielectric for the capacitors having the flat conductor crossovers as plates. For the low capacitive values required for crosstalk cancellation in accordance with this invention (in the illustrative embodiment being considered—2 picofarads), ordinary glass was found adequate in practice as a universally available material for the mounting plates. The glass thickness and the dimensions of the conductor crossovers are chosen to achieve the capacitance required within the frequency range of the signals to be transmitted through the network. The checkerboard pattern of the tip and ring chip locations in the mounting plate apertures advantageously provides areas for the capacitive crossovers which alternate in both horizontal and vertical coordinates with those chip locations.

This invention, in one integrated construction, thus offers solutions to a number of problems which have attended the implementation of balanced solid state switching networks. Redundant crosspoints are put to use; crosstalk cancellation is achieved without adding circuit elements or sacrificing compactness; and orderly twisted pair wiring patterns may be initiated immediately at the matrix tip and ring terminals, to name several, all of which serve to enhance the advantages of a balanced solid state switching network.

BRIEF DESCRIPTION OF THE DRAWING

The objects and features of this invention will be better understood from a consideration of the detailed description of the organization and operation of one illustrative embodiment thereof which follows when taken in conjunction with the accompanying drawing in which.

DETAILED DESCRIPTION

Figure 1:
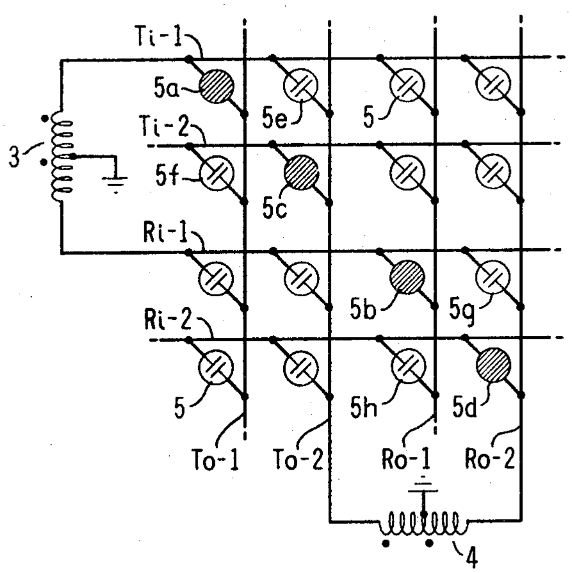
FIG. 1 depicts in simplified form a known solid state crosspoint arrangement referred to in the text to demonstrate one of the problems to which aspects of this invention are directed.
Figure 2:
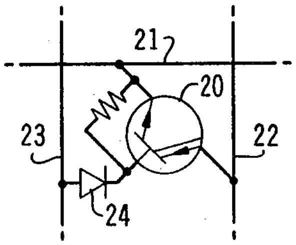
FIG. 2 shows in schematic form a typical PNPN thyristor crosspoint circuit, the details of which are assumed as being included in each of the crosspoints shown symbolically in the other figures of the drawing.

One problem presented by the inherent capacitance of inactive semiconductor crosspoints in a switching network may be briefly reviewed by reference to FIG. 1 in which is shown a simplified 2×2 tip and ring switching matrix. A pair of tip conductors Ti-1 and Ti-2 at the input side of the matrix in one coordinate intersects with a pair of tip conductors To-1 and To-2 at the output side in the other coordinate. Similarly, a pair of ring conductors Ri-1 and Ri-2 at the input side in one coordinate intersects with a pair of ring conductors Ro-1 and Ro-2 at the output side in the other coordinate. The tip and ring pairs are connected at each end by a transformer winding, such as the windings 3 and 4 shown connecting the input and output ends of the tip and ring conductors Ti-1 and Ri-1 and To-2 and Ro-2, respectively. Connected across the intersection of each of the coordinate conductors is a semiconductor crosspoint 5 shown only symbolically in the figure. These are assumed as comprising typical thyristor crosspoints, the details of one known form of which is depicted in FIG. 2 for reference. Briefly, the crosspoint circuit comprises a PNPN thyristor 20 having its anode and cathode connected, respectively, to the coordinate conductors 21 and 22 between which a conducting path may be established. Thyristor 20 is rendered conductive by selection holding current sources applied to the conductors 21 and 22 concurrently with a gating selection pulse applied to its base via a control conductor 23 and an isolating diode 24 as is known. A resistor connected between the anode and base of thyristor 20 provides protection against false activation due to transient network voltages. A typical network arrangement is thus shown in which two-wire conducting paths are balanced to ground by means of center-taps to ground at the transformer windings 3 and 4.

For purposes of describing an operation of the switch arrangement of FIG. 1, and thereby demonstrate the crosstalk problem, it will be assumed that connections have been established by the applicable crosspoints between tip and ring conductors Ti-1 and Ri-1 and To-1 and Ro-1 and also between Ti-2 and Ri-2 and To-2 and Ro-2. It will be further assumed that the tip and ring pair Ti-1 and Ri-1, etc., is the disturbing transmission path and that the also active tip and ring pair Ti-2 and Ri-2, etc., is the disturbed path. The capacitive disturbing effects, of course, are mutual and the roles of the two paths could have been reversed for purposes of description. The active crosspoints establishing these connections are identified as shaded in the drawing. Each of the remaining, inactive crosspoints is indicated as presenting a capacitance the effects of which may now be considered.

A signal induced at any instant from the primary winding, not shown in FIG. 1, to the transformer winding 3 may appear, say, as a positive, one unit signal on tip conductor Ti-1 and, therefore, because of the grounded center-tap of winding 3, as a negative, one unit signal on ring conductor Ri-1. This signal is transmitted, of course, via active crosspoints 5*a* and 5*b* to the vertical tip and ring conductors To-1 and Ro-1. At the same time the signal introduces a disturbing effect on the conducting path defined by the tip and ring conductors Ti-2 and Ri-2 and To-2 and Ro-2 interconnected by active crosspoints 5*c* and 5*d* and terminating in transformer winding 4. The effect of the capacitance of inactive crosspoints 5*e* and 5*f* introduces what, for simplicity, may be designated one unit of positive disturbance apiece for a total of two units of positive disturbance appearing at the termination of tip conductor To-2. Similarly, the effect of the capacitance of inactive crosspoints 5*g* and 5*h* introduces one unit of negative disturbance apiece for a total of 2 units of negative disturbance appearing at the termination of ring conductor Ro-2. An absolute total of 4 units of disturbance thus appears across the transformer winding 4 to be transmitted thereacross to the continuing transmission path. The cancellation of capacitance disturbance as exemplified by the four unit magnitude in the foregoing is advantageously accomplished in accordance with this invention in a switch organization as depicted in the schematic diagram of FIG. 3.

Figure 3:
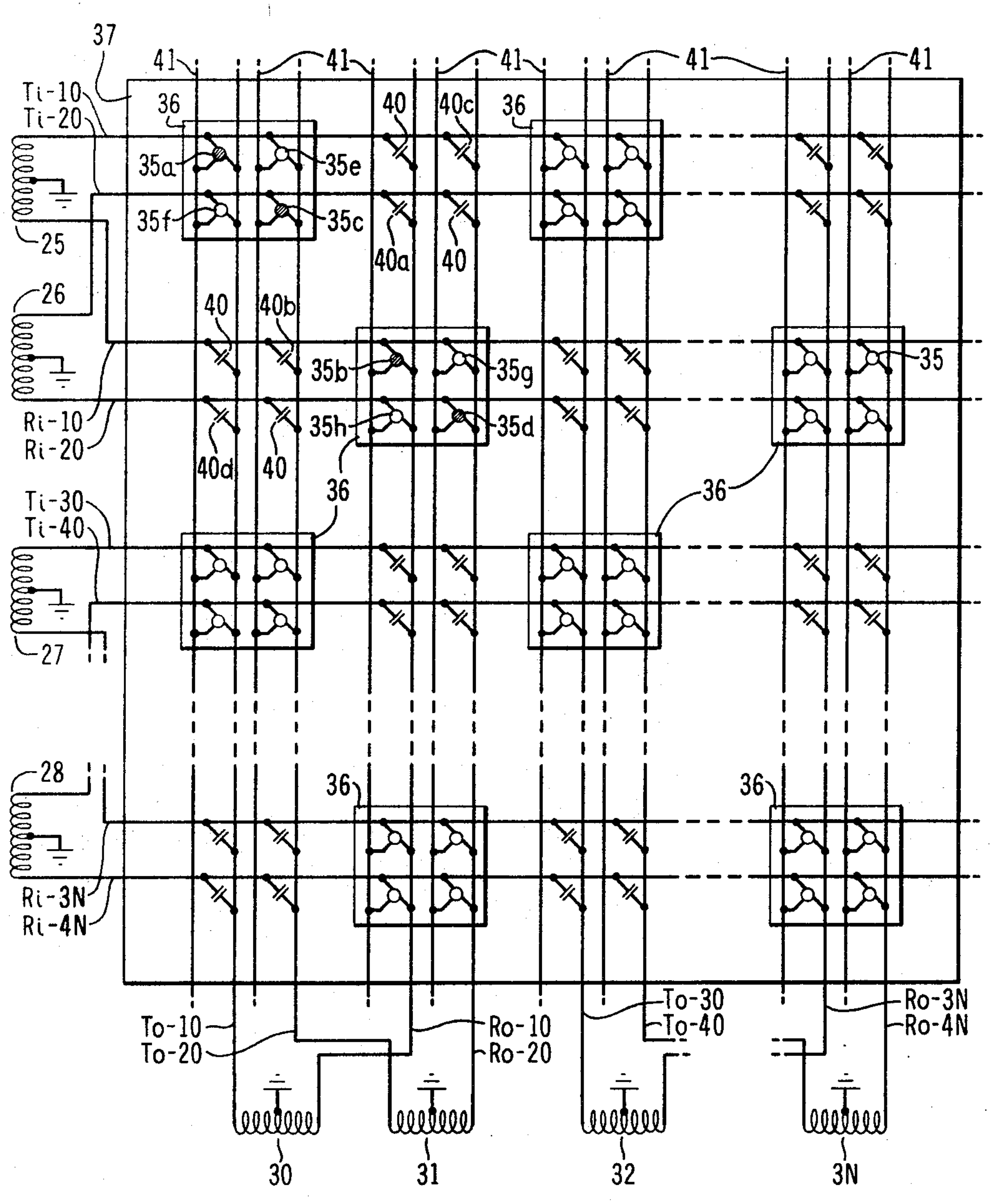
FIG. 3 shows an illustrative organization of tip and ring network crosspoint patterns in accordance with this invention.

The illustrative switch organization of FIG. 3 is essentially an expansion of the fragmentary diagram of FIG. 1 adding the incorporation of the novel circuit features of this invention. A plurality of tip and ring conductors Ti-10, -20 and Ti-30, -40, and Ri-10, -20, and Ri-3N, -4N in one coordinate of the matrix intersect with a second plurality of tip and ring conductors To-10, -20 and To-30, -40, and Ro-10, -20 and Ro-3N, -4N in the other coordinate. The tip and ring conductor pairs in the horizontal coordinate as viewed in the drawing originate, respectively, in grounded center-tap, secondary transformer windings 25, 26, 27, and 28. In a similar manner the tip and ring conductor pairs in the vertical coordinate terminate in grounded center-tap, transformer windings 30, 31, 32, and 3N, respectively. Each of the horizontal tip and ring conductor pairs is connectable to any of the vertical tip and ring conductor pairs by means of typical thyristor crosspoint pairs as described in conjunction with the diagram of FIG. 1. This is not only in accord with the novel organization of this invention, but also conforms to the actual physical disposition of the thyristor elements in practice. As mentioned hereinbefore, the thyristor elements are conventionally batch fabricated on a single chip—symbolized in FIG. 3 by the blocks 36—and all of the switch elements are mounted on a substrate 37. The conductor pair intersections and the crosspoint chips 36 are arranged in the switch in a checkerboard fashion. Thus, only alternate intersection points of the coordinate conductor pairs are provided with crosspoint elements. At each of the other alternate intersection points, the intersecting conductors are individually connected together by means of a capacitor such as the capacitors 40. The value of each of the capacitors 40 is selected to provide a cancellation of the disturbance, the introduction of which was described in the foregoing in connection with FIG. 1 and which cancellation will be described in detail below. The description of the switch organization of FIG. 3 is completed with a reference to control conductors 41 interconnecting in the vertical coordinates the bases of each of the crosspoint thyristors 35. Their function has already been referred to in connection with the description of the crosspoint circuit of FIG. 2 and they are included here only for completeness and for a better understanding of the physical construction of a switch assembly according to this invention to be considered hereinafter. It will be appreciated that the 4×4 array of FIG. 3 is only representative of much larger arrays attainable in accordance with this invention and, further, that normally the chips 36 may carry at least double the semiconductor elements shown for purposes of description.

Returning at this point to the disturbing effects of the inactive crosspoint capacitance exemplified in the diagram of FIG. 1, cancellation of these effects may now be described with further reference to the switch arrangement of FIG. 3. The disturbance appearing at winding 4 of FIG. 1 as considered in the foregoing is now assumed as appearing in the corresponding winding 31 in FIG. 3. This would result from the interaction of corresponding disturbing path Ti-10, To-10 and Ri-10, Ro-10 with the corresponding disturbed path Ti-20, To-20 and Ri-20, Ro-20 interconnected by active crosspoints 35*a*, 35*b*, 35*c*, and 35*d*, respectively, shown darkened in FIG. 3. Continuing the assumption of a positive and negative signal of one unit of absolute magnitude on the tip and ring conductors Ti-10 and Ri-10, respectively, the specific disturbance presently being considered is caused by the inherent capacitance of inactive crosspoints 35*e*, 35*f*, 35*g*, and 35*h*. From the analysis of the disturbance effects created in the circuit of FIG. 1, the disturbance contribution of the latter inactive elements is tabulated as follows:

On To-20
from 35*e*, +1 disturbing unit
from 35*f*, +1 disturbing unit
On Ro-20
from 35*g*, −1 disturbing unit
from 35*h*, −1 disturbing unit By a suitable selection of the values of the capacitors 40, the above disturbances may be virtually completely canceled. Thus, in the specific disturbance situation being described, capacitor 40*a* constitutes an alternating current bridge between disturbing ring conductor Ri-10 and disturbed tip conductor To-20 via active crosspoints 35*b* and 35*c*, ring conductor Ro-10 and tip conductor Ti-20. The direction of the interaction is here such that capacitor 40*a* introduces a negative one unit of disturbance on tip conductor To-20. Similarly, capacitor 40*b* constitutes a direct, second alternating current bridge between disturbing ring conductor Ri-10 and disturbed tip conductor To-20 to introduce a second negative 1 unit of disturbance on the latter conductor. In the same manner, capacitor 40*c* bridges directly disturbing tip conductor Ti-10 and disturbed ring conductor Ro-20 to introduce on the latter conductor a positive one unit of disturbance. Finally, capacitor 40*d* constitutes an alternating current bridge between disturbing tip conductor Ti-10 and disturbed ring conductor Ro-20 via active crosspoints 35*a* and 35*d*, tip conductor To-10 and ring conductor Ri-20. The direction of the interaction is such that capacitor 40*d* introduces a second positive unit of cancellation on the ring conductor Ro-20. In recapitulation, the canceling contributions of the indicated capacitors 40 are tabulated:

On To-20
from 40*a*, −1 canceling unit
from 40*b*, −1 canceling unit On Ro-20
from 40*c*, +1 canceling unit
from 40*d*, +1 canceling unit A comparison of the effects on tip conductor To-20 in the two tabulations in the foregoing shows a net zero disturbance effect as the result of the action of capacitors 40*a* and 40*b*. Similarly, a net zero disturbance effect on ring conductor Ro-20 is achieved by the capacitors 40*c* and 40*d* action. The sum disturbance across winding 31 is thus completely canceled by the absolute sum cancellation generated as described.

Only two of the four capacitors 40 appearing at the intersections of the tip and ring conductor pairs in the matrix of FIG. 3 were described as active in the cancelation operation. For the specific, illustrative operation described, the other two capacitors played no part and, conveniently, had no effect on the conducting paths, either those assumed or any other that may have been established in the network. These capacitors, however, would be active in disturbance cancellation in connection with other transmission paths established through the network. It will be apparent that, during and in addition to the disturbance effects specifically exemplified in the foregoing, interaction between the illustrative disturbing and disturbed paths will exist via other inactive crosspoints. Advantageously, to the extent and at the point that other disturbances are present, these will also be canceled in the manner described by the applicable capacitors at those network locations. The network organization of FIG. 3 which, in accordance with one aspect of this invention, provides canceling capacitors to overcome the inherent capacitance of inactive crosspoints, is implemented in accordance with another aspect to realize a novel and improved network matrix construction. This construction may now be considered with reference to FIG. 4.

Figure 4:
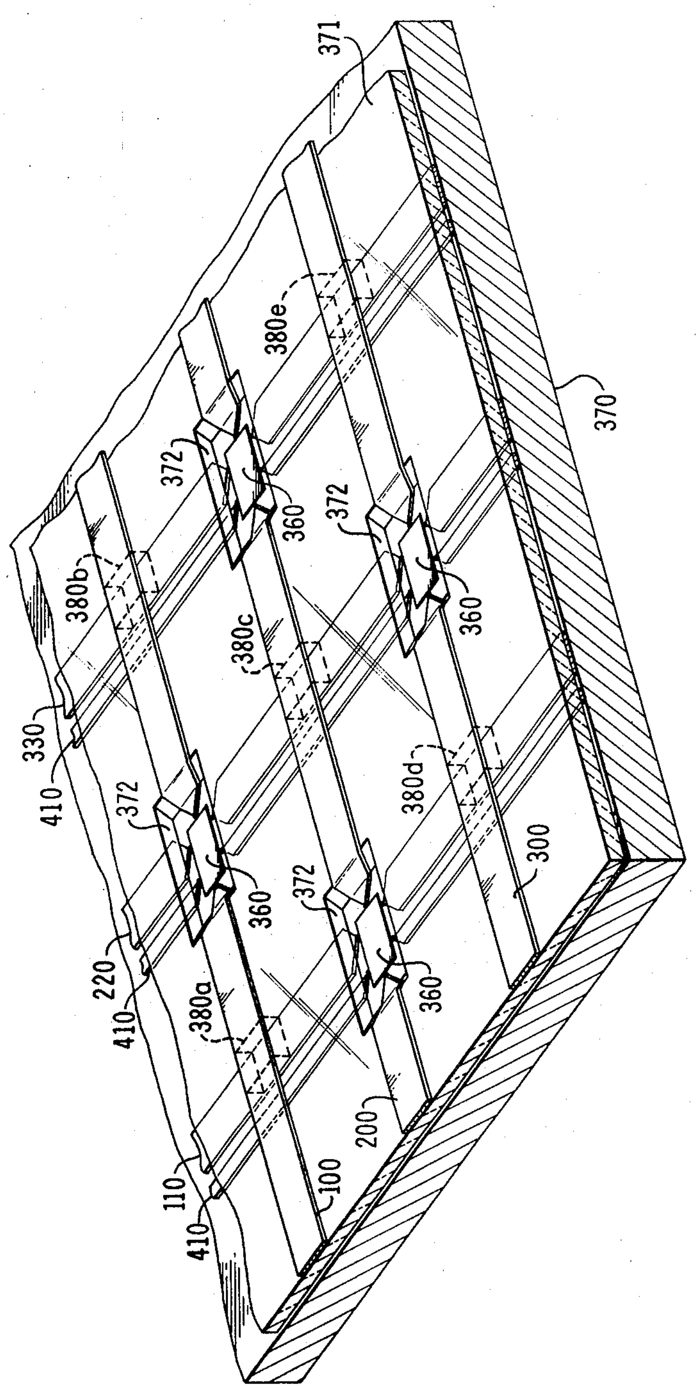
FIG. 4 is a three-quarter perspective view of a portion of a simplified solid state, integrated network construction organized as shown in FIG. 3.

A fragmented portion of a simplified matrix construction is shown in FIG. 4 in sufficient detail for an understanding of this aspect of the invention. To avoid the undue complexity which might obscure the structural details, the network is shown only in terms of single intersecting conducting paths arranged in checkerboard fashion with their crosspoints rather than in the tip and ring organization assumed in the prior descriptions. It will be appreciated that, in order to expand the construction of the network of FIG. 4 to conform to the organization of FIG. 3, or, for that matter, to larger networks, it is only necessary to multiply the semiconductor elements on the mounting chips. All of the elements of the network are mounted on an insulating substrate 370 in a manner well known in the art. In accordance with this invention, the intersecting conductors of the network, shown in the drawing as unterminated, are mounted on opposite sides of a glass plate 371 having a plurality of substantially rectangular apertures 372 therein. Mounted within the apertures 372 are the semiconductor crosspoint chips 360. The latter for simplicity are shown only as block symbols in the drawing and are assumed here to contain only single thyristor elements. Consistent with the organization of the network as depicted in FIG. 3, each crosspoint chip 360 is a concentration point for six conductors viewed from its input and output sides. Specifically, in the horizontal coordinates as viewed in the drawing, conductors 100, 200, and 300 are extended between crosspoint chips 360 on the upper side of plate 371. On the under side of plate 371 between the latter and substrate 370, in the vertical coordinates, conductors 110, 220, and 330 are extended between crosspoint chips 360. On the same side and in the same coordinates, control conductors 410 also extend between crosspoint chips 360. The connections, not shown in the drawing, of the horizontal and vertical conductors to the thyristor crosspoint circuits are made as shown in the diagram of FIG. 2. To carry out the checkerboard scheme, the chips 360 are arranged at alternating intersection points of the horizontal and vertical conductors in both coordinates. At the other alternating points the intersecting conductors define the capacitors constituting an important aspect of this invention.

Specifically, the conductors, conventionally formed strip-like, define at their intersections on opposite sides of the glass plate 371 and therewithin, rectangular sections 380. Thus, the flat conductor 100 on the upper side of the plate 371, defines at its intersections with the flat conductors 110 and 330 on the under side, rectangular sections 380*a* and 380*b*, respectively. In the fragmentary portion of the matrix of FIG. 4, three other such sections, 380*c*, 380*d*, and 380*e*, are also defined by the intersections of the applicable conductors. These sections of the plate 371 constitute the dielectrics of capacitors for which the defining areas of the intersecting conductors comprise the plates. In practice where a two picofarad capacitance at each conductor intersection was required and a glass plate 371 of a thickness of 0.0008 inches was employed, a defining conductor intersection area of approximately 0.025 inches by 0.040 inches was found to yield the required capacitance at the frequencies tested. Although glass was used as a mounting plate-dielectric for its availability, other suitable dielectric materials could as well have been employed and the dimensions adjusted to meet individual capacitive requirements.

Each of the capacitor sections 380 operates in its disturbance cancellation function in the manner described in detail in connection with the capacitors 40 of the network of FIG. 3 and a description of this operation need not be repeated at this point. What has been described is considered to be only one illustrative network organization according to this invention and it is to be understood that various and numerous other arrangements may be devised by one skilled in the art without departing from the spirit and scope of the accompanying claims.

What is claimed is:

1. A coordinate switching network comprising a plurality of first conductors arranged in one set of coordinates, a plurality of second conductors arranged in a second set of coordinates and intersecting said first conductors to define a coordinate array of crosspoints, a plurality of semiconductor elements connecting each of said first conductors with each of said second conductors at alternate ones of said crosspoints in each of said sets of coordinates, each of said semiconductor elements presenting a particular capacitance to alternating current at a predetermined frequency when in the inactive state, and a plurality of capacitor means connecting each of said first conductors with each of said second conductors at the other alternate ones of said crosspoints in each of said sets of coordinates, each of said capacitor means presenting said particular capacitance.

2. A coordinate switching network comprising a plurality of groups of first conductors arranged in one set of coordinates, a plurality of groups of second conductors arranged in a second set of coordinates and intersecting said first conductors to define a coordinate array of groups of crosspoints, a plurality of semiconductor elements connecting each of said first conductors with each of said second conductors at the crosspoints of alternate groups of said groups of crosspoints in each of said sets of coordinates, each of said semiconductor elements presenting a particular capacitance to alternating current at a predetermined frequency when in the inactive state, and a plurality of capacitor means connecting each of said first conductors with each of said second conductors at the crosspoints of the other alternate groups of said groups of crosspoints, each of said capacitor means presenting said particular capacitance.

3. A coordinate switching network according to claim 2 in which said groups of first conductors and said groups of second conductors each comprise tip and ring conductors of balanced transmission paths through said network.

4. A coordinate switching network according to claim 3 in which each of said semiconductor elements comprises a PNPN thyristor having its anode connected to a first conductor and its cathode connected to a second conductor.

5. A coordinate switching network comprising a plurality of pairs of first conductors arranged in one set of coordinates, a plurality of pairs of second conductors arranged in a second set of coordinates and intersecting said pairs of first conductors to define a coordinate array of groups of crosspoints, a plurality of semiconductor elements connecting each conductor of said pairs of first conductors with the corresponding conductor of each of said pairs of second conductors at the crosspoints of alternate groups of said groups of crosspoints in each set of coordinates, each of said semiconductor elements presenting a particular capacitance to alternating current at a predetermined frequency when in the inactive state, and a plurality of capacitor means connecting each conductor of said pairs of first conductors with the corresponding conductor of each of said pairs of second conductors at the crosspoints of the other alternate groups of said groups of crosspoints, each of said capacitor means presenting said particular capacitance.

6. A coordinate switching network according to claim 5 also comprising a transformer winding connected between one end of each of said pairs of said first conductors and one end of each of said pairs of said second conductors, each of said transformer windings having a grounded center-tap.

7. A coordinate switching network construction comprising a planar mounting plate, a plurality of first conductors arranged in one set of coordinates on one side of said plate, a plurality of second conductors arranged in a second set of coordinates on the other side of said plate and intersecting said first conductors to define a coordinate array of crosspoints, said plate having a plurality of apertures therein at alternate ones of said crosspoints in each of said sets of coordinates, a plurality of semiconductor elements connecting each of said first conductors with each of said second conductors through said apertures, and a plurality of capacitor means connecting each of said first conductors with each of said second conductors at the other alternate ones of said crosspoints in each of said sets of coordinates, said capacitor means at each of said last-mentioned crosspoints comprising the intersection of said first and second conductors having therebetween a dielectric comprising a section of said plate defined by said intersection.

8. A coordinate switching network construction comprising a planar mounting plate, a plurality of groups of first conductors arranged in one set of coordinates on one side of said plate, a plurality of groups of second conductors arranged in a second set of coordinates on the other side of said plate and intersecting said groups of first conductors to define a coordinate array of groups of crosspoints, said plate having a plurality of apertures therein at alternate ones of said groups of crosspoints in each of said sets of coordinates, a plurality of semiconductor elements connecting each of said first conductors with each of said second conductors through said apertures, and a plurality of capacitor means connecting each of said first conductors with each of said second conductors at the other alternate ones of said groups of crosspoints in each of said sets of coordinates, said capacitor means at each of said last-mentioned crosspoints comprising the intersection of said first and second conductors having therebetween a dielectric comprising a section of said plate defined by said intersection.

9. A coordinate switching network construction as claimed in claim 8 in which each of said semiconductor elements presents a particular capacitance to an alternating current of a predetermined frequency when in an inactive state and in which said first and second conductors and the cross section of said plate are so dimensioned that each of said capacitor means presents said particular capacitance.

10. A coordinate switching network arrangement comprising a plurality of groups of first conductors arranged in one set of coordinates of said network, a plurality of groups of second conductors arranged in a second set of coordinates and intersecting said groups of first conductors to define a coordinate array of crosspoints, a plurality of semiconductor elements connecting each of said first conductors with each of said second conductors at alternate ones of said groups of crosspoints in each of said sets of coordinates, and a plurality of capacitor means connecting each of said first conductors with each of said second conductors at the other alternate ones of said groups of crosspoints in each of said sets of coordinates, said capacitor means at each of said last-mentioned crosspoints comprising portions of each of said first and second conductors defined by the intersecting other of said last-mentioned first and second conductors and a dielectric material interposed between said portions.

11. A coordinate switching network arrangement as claimed in claim 10 in which said dielectric material comprises a portion of a planar plate having mounted thereon on opposite sides, respectively, said plurality of groups of first conductors and said plurality of groups of second conductors.

12. A coordinate switching network arrangement as claimed in claim 11 in which said plate has apertures provided therein at said alternate ones of said groups of crosspoints and said plurality of semiconductor elements comprise thyristors mounted on a single chip within each of said apertures.

13. A coordinate switching network arrangement as claimed in claim 12 in which said dielectric material is glass.

* * * * *